(12) United States Patent
Darbyshire

(10) Patent No.: US 8,313,060 B2
(45) Date of Patent: Nov. 20, 2012

(54) AIRCRAFT PASSENGER SEAT

(75) Inventor: Martin Darbyshire, London (GB)

(73) Assignee: British Airways PLC, West Drayton (GB)

( * ) Notice: Subject to any disclaimer, the term of this patent is extended or adjusted under 35 U.S.C. 154(b) by 568 days.

(21) Appl. No.: 12/301,601

(22) PCT Filed: May 16, 2007

(86) PCT No.: PCT/GB2007/001796
§ 371 (c)(1),
(2), (4) Date: Nov. 30, 2009

(87) PCT Pub. No.: WO2007/135373
PCT Pub. Date: Nov. 29, 2007

(65) Prior Publication Data
US 2010/0065683 A1 Mar. 18, 2010

(30) Foreign Application Priority Data
May 19, 2006 (GB) .................................. 0610071.3

(51) Int. Cl.
B64D 11/06 (2006.01)

(52) U.S. Cl. .................................................. 244/118.6

(58) Field of Classification Search .............. 244/117 R, 244/118.2, 118.5, 118.6, 122 R; 297/60, 297/61, 71, 75, 123, 147, 161, 162
See application file for complete search history.

(56) References Cited

U.S. PATENT DOCUMENTS

| 6,209,956 | B1 * | 4/2001 | Dryburgh et al. | 297/245 |
| 7,419,214 | B2 * | 9/2008 | Plant | 297/245 |
| 7,517,010 | B2 * | 4/2009 | Saint-Jalmes et al. | 297/118 |
| 7,665,693 | B2 * | 2/2010 | Bettell | 244/122 R |
| 7,721,991 | B2 * | 5/2010 | Johnson | 244/118.6 |
| 7,798,446 | B2 * | 9/2010 | Park | 244/118.6 |
| 7,946,532 | B2 * | 5/2011 | Martin | 244/122 R |
| 7,975,962 | B2 * | 7/2011 | Jacob | 244/118.6 |
| 7,997,531 | B2 * | 8/2011 | Bettell | 244/118.6 |
| 8,011,723 | B2 * | 9/2011 | Park et al. | 297/118 |
| 8,096,502 | B2 * | 1/2012 | Bock et al. | 244/118.6 |
| 2004/0232283 | A1 | 11/2004 | Ferry et al. | |
| 2005/0067870 | A1 | 3/2005 | Rezag et al. | |

FOREIGN PATENT DOCUMENTS

| EP | 1 366 987 A1 | 12/2003 |
| EP | 1 417 113 A1 | 5/2004 |
| FR | 2 860 194 A1 | 9/2003 |

(Continued)

OTHER PUBLICATIONS

Patents Act 1977: Search Report under Section 17 for Application No. GB0610071.3, dated Aug. 16, 2006. International Search Report (ISR) for PCT/GB2007/001796, I.A.fd: May 16, 2007, mailed Sep. 3, 2007, including the Written Opinion from the European Patent Office.

(Continued)

Primary Examiner — Richard Price, Jr.
(74) Attorney, Agent, or Firm — Sterne, Kessler, Goldstein & Fox, P.L.L.C.

(57) ABSTRACT

An aircraft passenger seating arrangement comprises a seat having a seat pan and a seat back, the seat being able to adopt a first, substantially upright sitting position and a second, sleeping position in which the seat back and seat pan are substantially horizontal, the arrangement further including a side surface arranged to form part of a substantially flat, horizontal sleeping surface alongside the seat.

22 Claims, 8 Drawing Sheets

FOREIGN PATENT DOCUMENTS

| | | |
|---|---|---|
| GB | 2 362 095 A | 11/2001 |
| WO | WO 96/18537 | 6/1996 |
| WO | WO 98/36967 | 8/1998 |
| WO | WO 00/21831 | 4/2000 |
| WO | WO 2006/054104 A1 | 5/2006 |
| WO | WO 2007/061381 A1 | 5/2007 |

OTHER PUBLICATIONS

U.S. Appl. No. 12/398,873 for "A Seating Unit", filed Mar. 5, 2009.
U.S. Appl. No. 12/158,637 for "Aircraft Passenger Seat", filed Dec. 22, 2006.

* cited by examiner

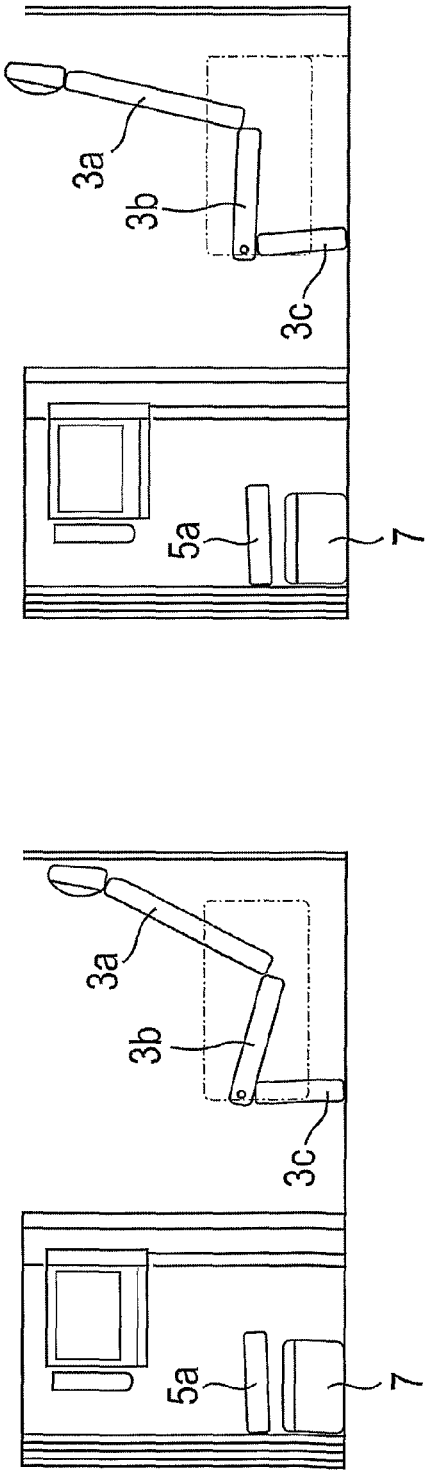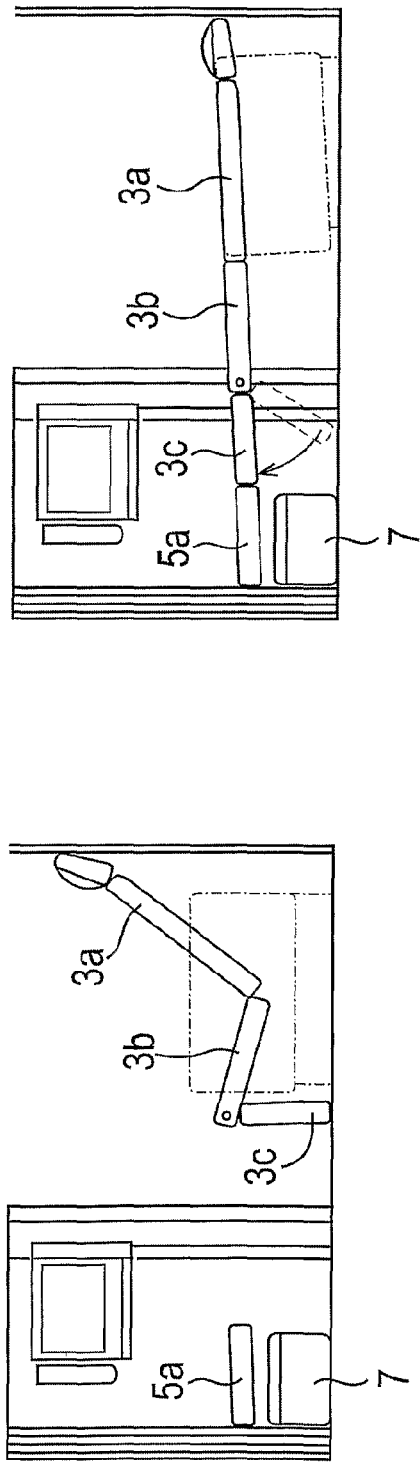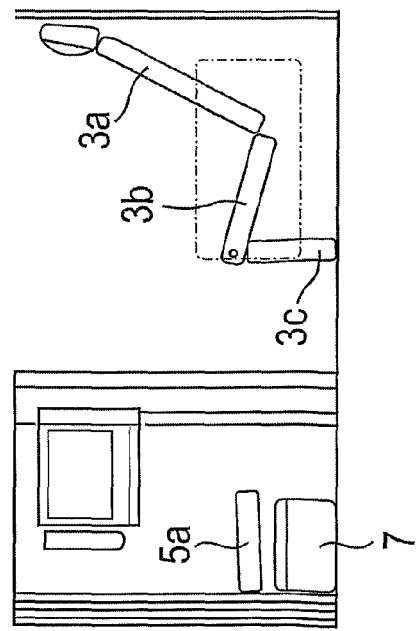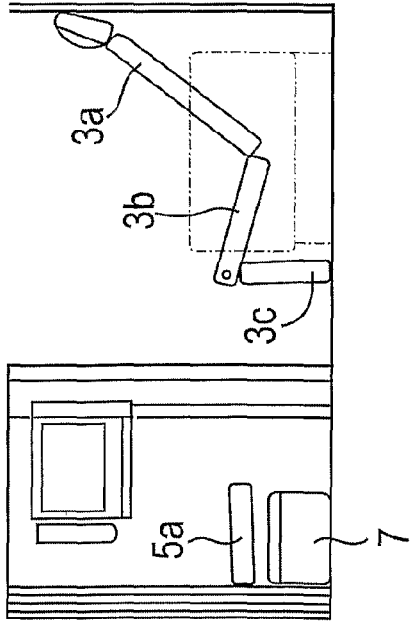

AIRCRAFT PASSENGER SEAT

The present invention relates to an aircraft passenger seat, particularly but not exclusively to an aircraft sleeper seat convertible into a substantially flat bed.

BACKGROUND TO THE INVENTION

Examples of prior art aircraft sleeper seats are disclosed in the applicant's patent publications WO-A-9618537 and WO-A-0021831, embodiments of which include the current British Airways First and Club World seats respectively. Both of these seats can be converted into a flat, horizontal bed, and have enjoyed great commercial success. However, there is intense competition to provide ever-greater comfort and space for aircraft passengers.

Passenger seats for aircraft are subject to stringent design constraints, many of which are not applicable to seats for other vehicle types. One problem is the need to meet the relevant safety standards for aircraft passenger seats, such as the 16 g test that requires seats to survive deceleration of 16 g in a takeoff/landing position. Another problem is the need to minimize the weight of the seat, since carrying extra weight on an aircraft increases fuel consumption and therefore monetary and environmental cost. Hence, the seat must be both strong and light.

Another problem relates to the use of space. Any given aircraft has a maximum area for passenger seating, which must be used in the most space-efficient manner possible so as to maximize the seating area and legroom available to each passenger, while allowing unimpeded exit from the seat. It is also important for cost reasons to fit as many passenger seats as possible in the available area.

Another problem relates to the level of comfort of the seat. Aircraft passenger seats may be used for day flights, in which the passenger will want to work, eat and/or relax, and night flights during which the passenger will want to sleep. Preferably, an aircraft passenger seat should be able to adopt comfortable positions for all of these activities, yet also be able to meet the relevant safety standards in a takeoff/landing position.

Another problem relates to the psychological and/or social needs of aircraft passengers, who may desire privacy while working, eating or sleeping, or may wish to interact with a travelling companion. There are also some arrangements that are undesirable for aesthetic and/or psychological reasons; for example, it is preferred that parts of the seat mechanism are not visible to the passenger.

In first class seats, the passenger demands the greatest possible level of comfort and it is accepted that fewer passenger seats will be accommodated in the available area than would be the case for economy or business class. For first class sleeper seats, it is desirable to provide a sleeping arrangement that is as close as possible to a normal bed. However, normal single beds are considerably wider than an aircraft passenger seat needs to be.

One approach to this problem has been to provide armrests that retract so as to be level with the seat in a fully reclined position, so that the width of the armrests is added to the seat width. One such arrangement is disclosed in Patent publication no. WO 98/36967 (Singapore Airlines).

Another approach to this problem can be seen in the Odyssey™ aircraft seat disclosed at http://www.flatseats.com/Product/news-contour-3108.htm on 28 Oct. 2005 or earlier, and described in an article in the London Evening Standard on 8 Jul. 2005. As shown schematically in FIG. 1, the arrangement comprises a bed surface 1 adjacent to one side of a reclining seat 2. One disadvantage of this arrangement is that the seat pitch, i.e. the spacing between adjacent rows of seats, is very short and so legroom is restricted. Also, the bed surface 1 takes up a great deal of space so it is not practicable to increase the seat pitch as this leads to very inefficient use of space. Another problem is that the seat 2 does not provide a deep reclined position suitable for resting. Another problem is that the passenger has to adopt a completely different position when sleeping than when sitting, and so has to rearrange personal effects, bedding, cushions and the like when moving from the sitting to sleeping position.

STATEMENT OF THE INVENTION

According to the present invention, there is provided an aircraft passenger seating arrangement comprising a seat having a seat pan and a seat back, the seat being able to adopt a first, substantially upright sitting position and a second, sleeping position in which the seat back and seat pan are substantially horizontal, the arrangement further including a side surface arranged to form part of a substantially flat, horizontal sleeping surface alongside the seat.

In one aspect, the side surface is positioned substantially alongside the seat pan in the sleeping position. The side surface may have a major axis substantially in the longitudinal direction of the seat. The underside of the side surface may be provided with lighting means, preferably arranged to direct light downwards.

In another aspect, there is provided an end surface arranged to form part of a substantially flat, horizontal sleeping surface forward of the seat. The end surface may be substantially continuous with the side surface and may be integrated therewith. The seat may include an auxiliary surface that is positioned between the seat pan and the end surface in the sleeping position. The auxiliary surface may be connected to the seat pan, so that it may be stowed in the sitting position and deployed in the sleeping position. The end surface may comprise a secondary seat. Part or all of the end surface may be stowable. There may be provided a movable footstool stowable under the end surface.

There may be provided a plurality of such seating arrangements configured along a wall of an aircraft, with the side surfaces of the seating arrangements provided at a side towards the wall. There may be provided an adjacent pair of such seating arrangements, with the side surfaces of the pair arranged mutually inwardly.

BRIEF DESCRIPTION OF THE DRAWINGS

Embodiments of the invention will now be described with reference to the drawings identified below.

FIGS. 4a to 4d are schematic side views of the seat in the respective positions.

DETAILED DESCRIPTION OF THE EMBODIMENTS

Terminology

In describing the embodiments, 'horizontal' and 'vertical' are defined with reference to the floor of the passenger seating area of the aircraft. As in well known in the art, the angle of the floor relative to the gravitational horizontal is determined by the pitch of the aircraft, which is about 15° during takeoff and landing, and about 3° in level flight. When describing an individual seat, 'forward' and 'rearward' are defined with reference to the direction in which the passenger faces when seated.

Seating Arrangement

Figure 1:
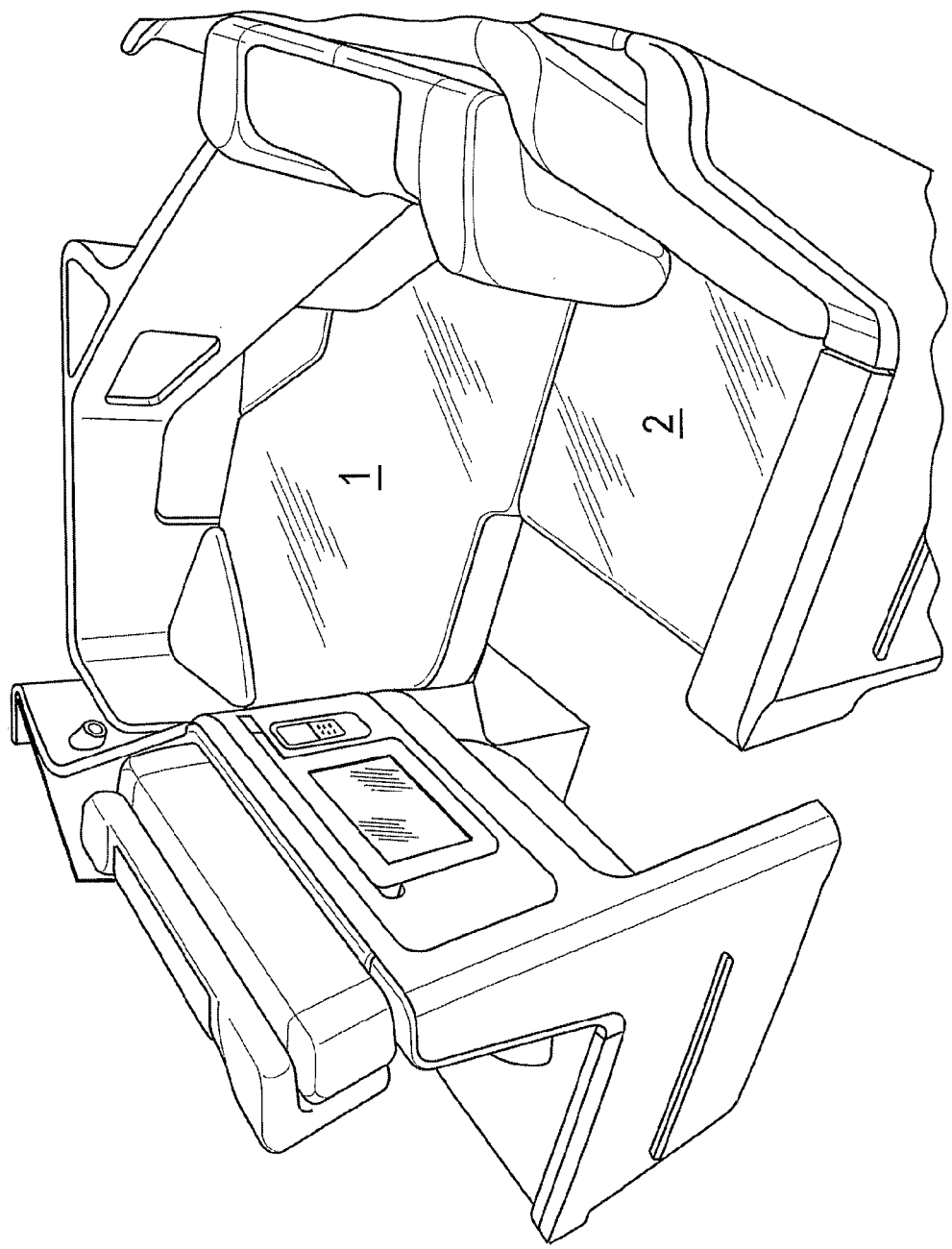
FIG. 1 shows a prior art aircraft passenger sleeper seat.
Figure 2:
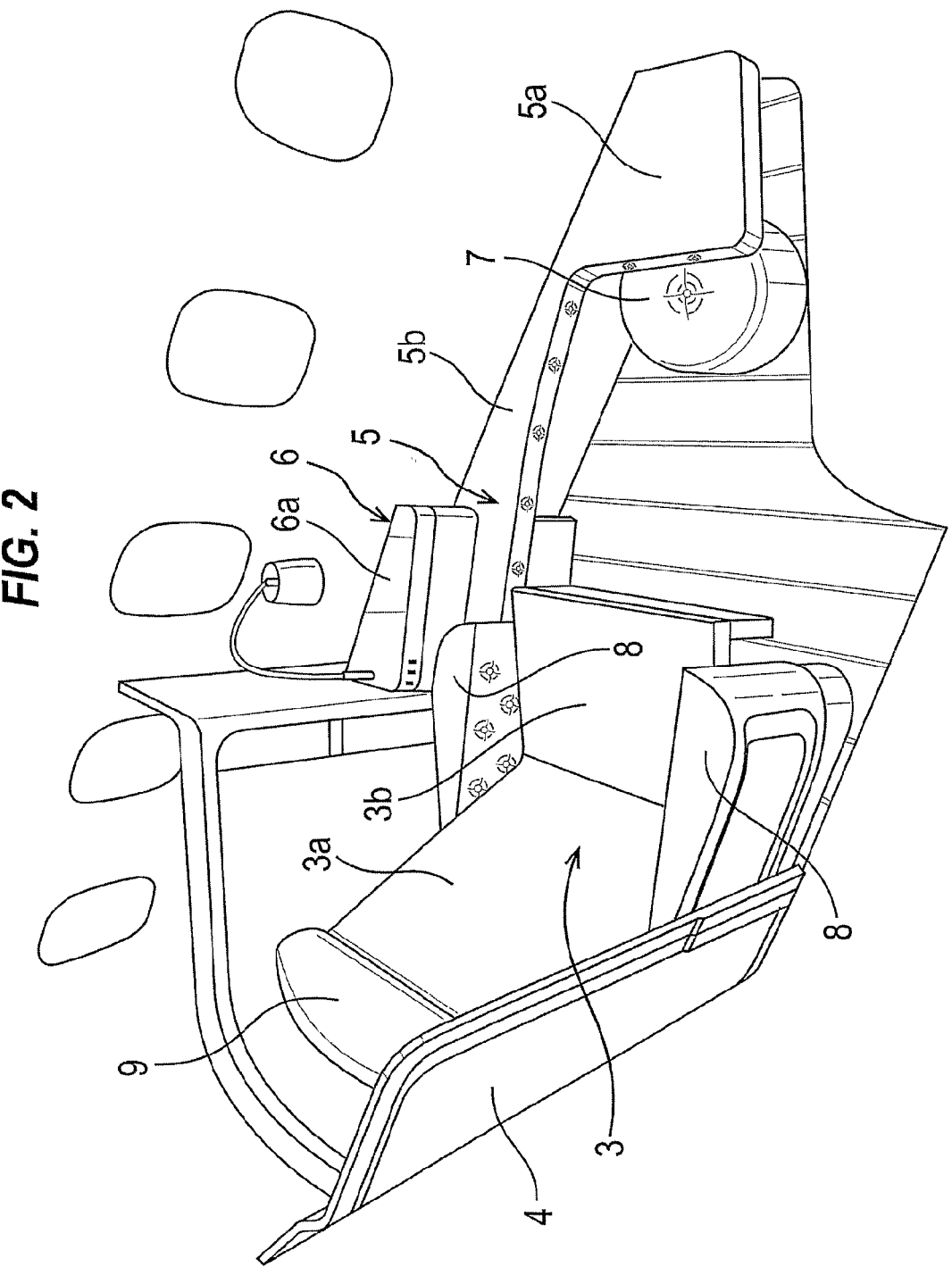
FIG. 2 is a perspective view of an aircraft passenger sleeper seat according to an embodiment of the invention.

As shown in FIG. 2, an aircraft passenger seating arrangement in an embodiment of the present invention comprises the following main components: a seat 3 comprising seat back 3a and seat pan 3b, a housing or shell 4 partially surrounding the seat 3, a surround 5 extending along the side and forward of the seat 3, and a 'credenza' or cabinet 6. The main components may be constructed as separate components and installed together in an aircraft to form the seating arrangement. An ottoman 7 is provided, but is not integrated with the main components of the seating arrangement. Not all of the main components are essential to all aspects of the present invention.

The seat 3 includes a headrest 9 attached to the seat back 3a, and an armrest 8 at either side of the seat pan 3b. One or both of the armrests 8 may be lowered or retracted so that they are substantially level with, and preferably continuous with the surround 5.

The surround 5 comprises the end portion 5a, arranged forward of the seat 3, and a side portion 5b, extending substantially longitudinally to one side of the seat 3. The surround 5 is preferably fixed with respect to the floor, and its height is not adjustable by the passenger.

The cabinet 6 is positioned to one side of the seat 3, adjacent the side portion 5a of the surround. The cabinet 6 may house one or more passenger facilities, such as a stowable table, a light, controls for reclining the seat 3 and/or operating an in-flight entertainment (IFE) system. The cabinet 6 has a top surface 6a for use as an occasional table or cocktail tray.

The ottoman 7 is not fixed to the floor of the passenger area but can be freely positioned on the floor to act as a footrest. Preferably, the ottoman 7 can be stowed under an end portion 5a of the surround 5. The ottoman 7 may have a lid and provide interior storage space. Preferably, the ottoman 7 is attached by a tether to a fixing point, to prevent the ottoman 7 from being removed from the passenger area, or causing a hazard in turbulent conditions.

The shell 4 extends behind and to at least one side, and preferably to both sides of the seat 3. Preferably, the shell 4 is arranged as a privacy screen; for example, it may conceal the seated passenger, at least partially, from surrounding seated passengers. Preferably, the seat back 3a remains substantially within the shell 4 as it reclines; for example, the headrest 9 does not project significantly, or at all, above the shell. Preferably, the shell 4 conceals and/or hinders passenger access to a reclining mechanism for the seat 3. The shell 4 may also provide passenger storage and/or facilities, such as an IFE screen stowable flush with the shell 4.

Seat Reclining Positions

The seating arrangement includes a seat reclining mechanism which allows the seat 3 to be positioned in at least a sitting and a sleeping position, and preferably in each of the following four positions, as shown in FIGS. 3a to 3d and 4a to 4d:

a) taxi, takeoff and landing (TTOL) position: the seat back 3a is slightly reclined, at 20-30° to the vertical, and the seat pan 3b is tilted rearward by 10-20°, to provide a secure and comfortable position. Preferably, the seat 3 meets the 16 g test criteria in this position.

b) upright sitting position: the seat back 3a is fully upright, at 15-20° to the vertical, and the seat pan is tilted rearwardly by 2-10° to provide a comfortable position for working or eating.

c) reclined position: the seat back 3a is reclined, at 20-50° to the vertical, and the seat pan 3b is tilted rearward by 10-20°, to provide a comfortable position for resting and using IFE.

d) Bed position: the seat back 3a and seat pan 3b are substantially horizontal, at 0-10° to the horizontal, and form a substantially continuous and/or flat surface suitable for sleeping on.

Figure 3A:
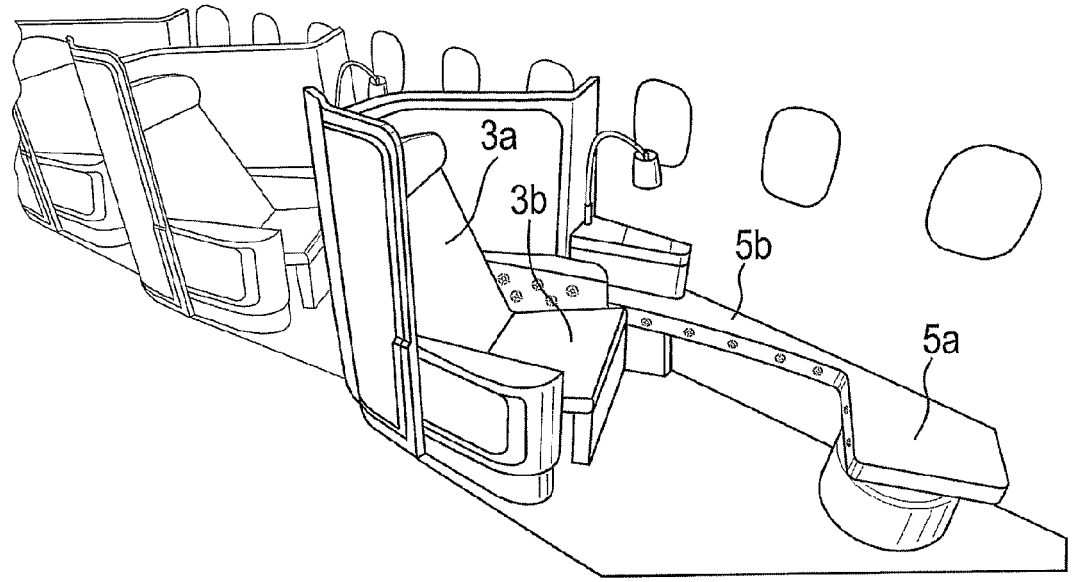
FIGS. 3a to 3d are perspective views of the seat respectively in TTOL, upright, reclined and bed positions.
Figure 3B:
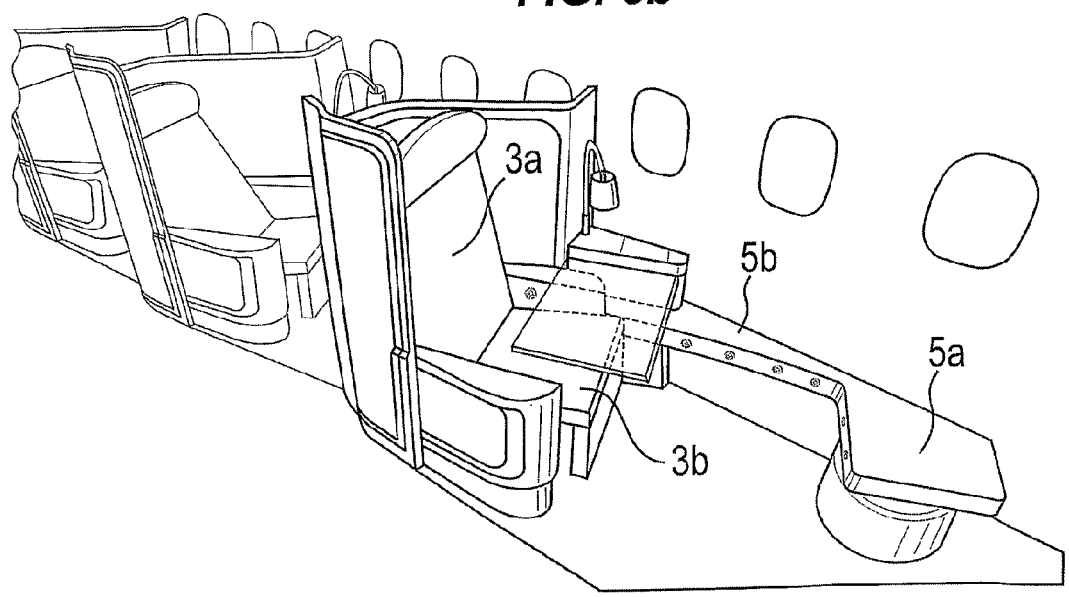
Figure 3C:
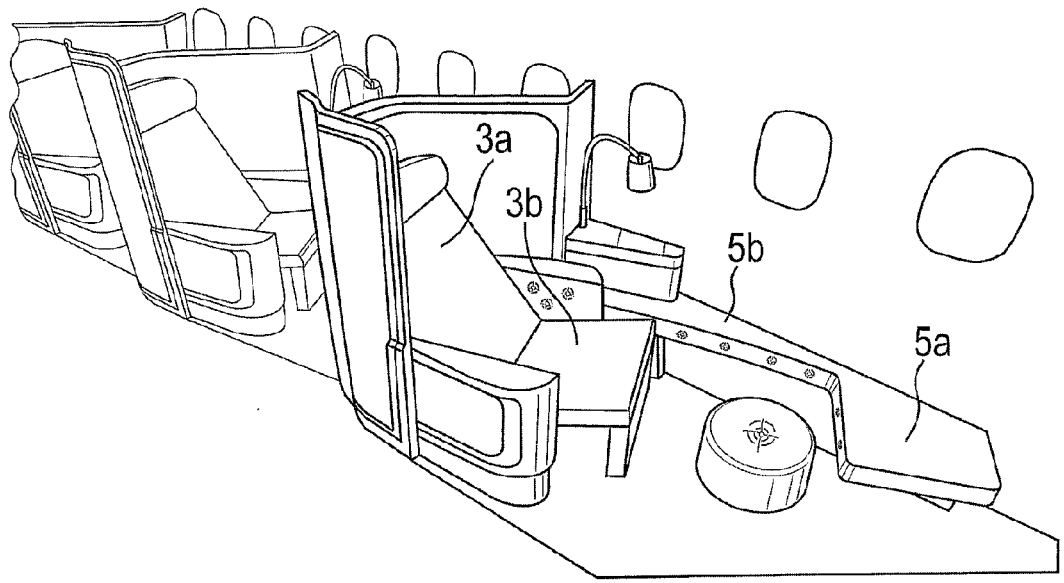
Figure 3D:
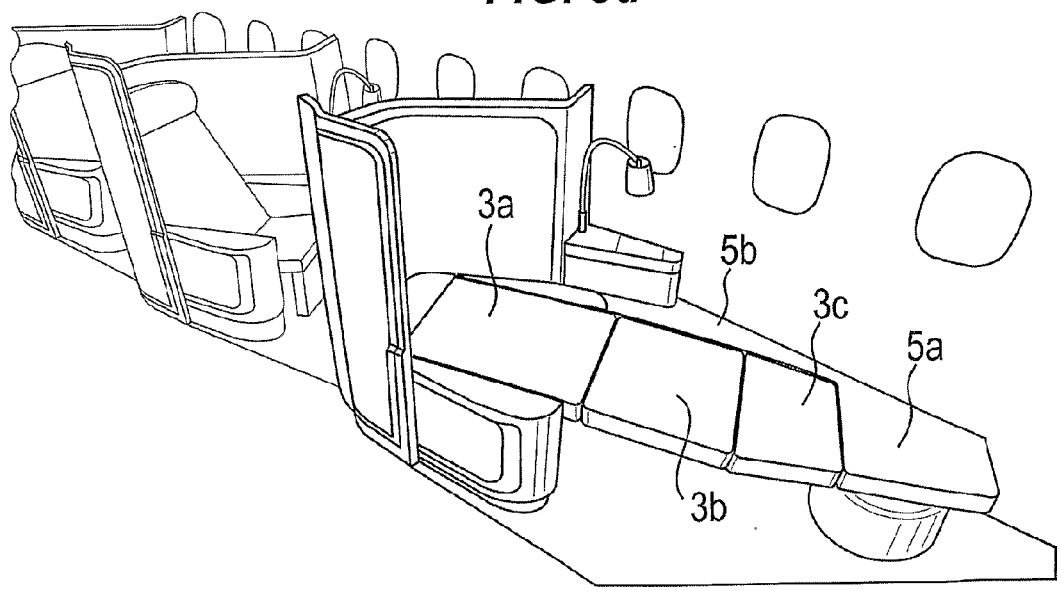

An auxiliary surface 3c is pivotally attached to the forward end of the seat pan 3b. In positions a) to c), the auxiliary surface 3c is stowed under the seat pan 3b, and is preferably substantially vertical. In position d), the auxiliary surface 3c is driven by the seat reclining mechanism to a substantially horizontal position, so that the seat back 3a, seat pan, auxiliary surface 3c and surround end portion 5a form a substantially flat, horizontal and continuous sleeping surface. As shown in FIG. 3d, the side portion 5b of the surround 5 is substantially coplanar and/or continuous with the seat pan 3b and auxiliary surface 3c so as to form a sleeping surface that is wider than the seat pan 3b. One or both of the armrests 8 may be driven by the seat mechanism to retract in position d), so as to form a flat continuous surface with the seat back 3a and/or the side portion 5b of the surround 5.

Hence, the seat arrangement may provide a sleeping surface that is considerably wider than the seat pan along the majority of the length of the sleeping surface. Moreover, the major axis of the sleeping surface is in the longitudinal direction of the seat 3, so the passenger need not greatly adjust his or her orientation when moving to the sleeping position d) from another position. The side portion 5b is elongate, with a major axis substantially parallel to the longitudinal direction of the seat 3, so that it does not greatly increase the overall width of the seating arrangement.

Preferably, the seat reclining mechanism and/or controls enable the seat 3 to be reclined continuously between the positions a) to d) and maintained in any of those positions or in intermediate positions therebetween. Alternatively, the seat reclining mechanism and/or controls may restrict the positions in which the seat 3 may be maintained. However, it is preferable that a continuous transition between at least positions b) and c) is possible.

As can be seen from FIGS. 3a to 3d and 4a to 4d, the seat mechanism is operable to lift the seat pan 3b to a substantially horizontal position level with the surround 5 as the seat approaches the sleeping position d). Specific mechanisms for achieving combined pivoting and lifting of seat pans are known per se in the art.

The seat mechanism further acts to drive the auxiliary surface 3c from its stowed position in seat positions a) to c) to its substantially horizontal position in seat position d). Mechanisms for driving legrests pivotally attached to seat pans are known per se in the art and may be used to drive the auxiliary surface 3c, with suitable modifications.

Surround with Buddy Seat

Figure 5A:
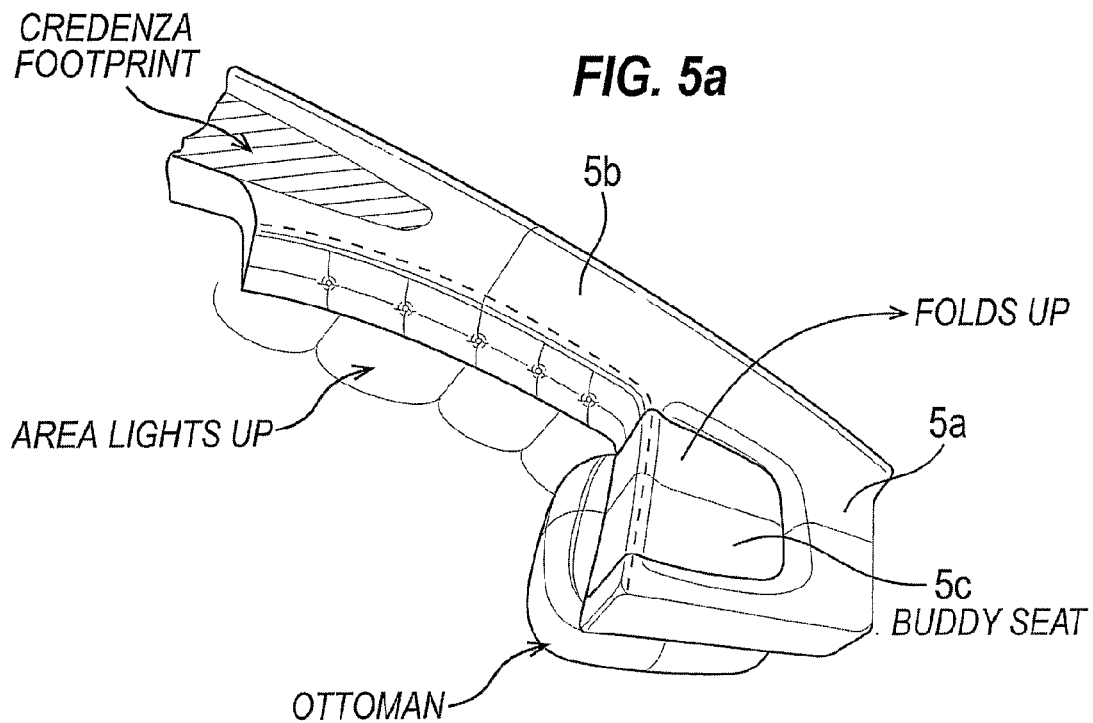
FIGS. 5a and 5b show a bed surround component of the seat respectively in perspective and cross-sectional views, in a further embodiment of the invention.
Figure 5B:
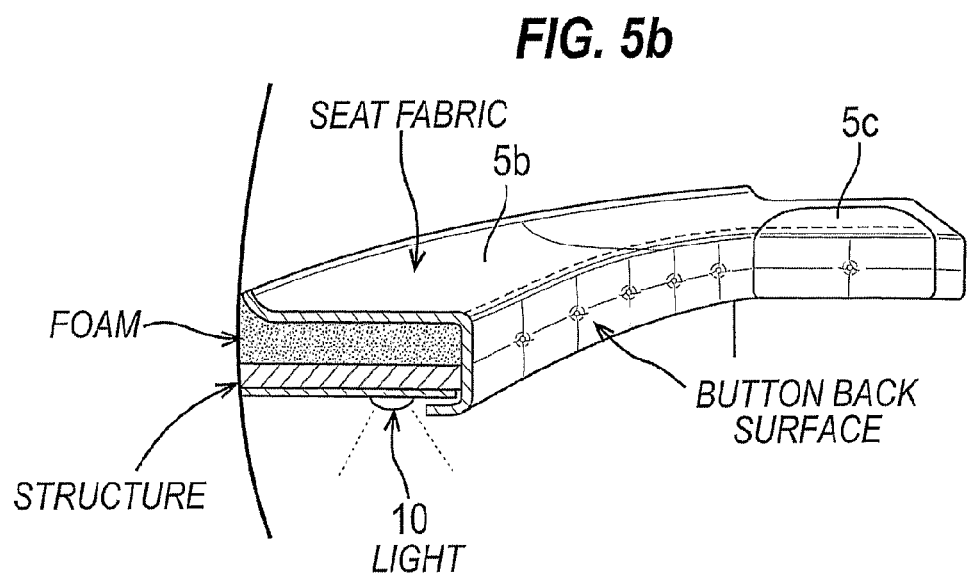

In a further embodiment shown in FIGS. 5a and 5b, the forward portion 5a of the surround may be configured as a 'buddy seat' suitable for a companion to sit on, facing the passenger in the seat 3. The buddy seat may comprise a buddy seat portion 5c that is pivotally mounted in the forward portion 5a so as to pivot upwardly into a substantially vertical position, leaving an opening in the forward portion 5a to make more floor space available for the passenger, or to allow the passenger to rest his or her feet on the ottoman 7 in position c). The surround 5 may have an upholstered upper surface similar to that of the seat 3. Lighting 10 may be provided on the underside of the surround 5, preferably under the side portion 5b, to provide a downlighting effect.

Cabin Layout

Figure 6:
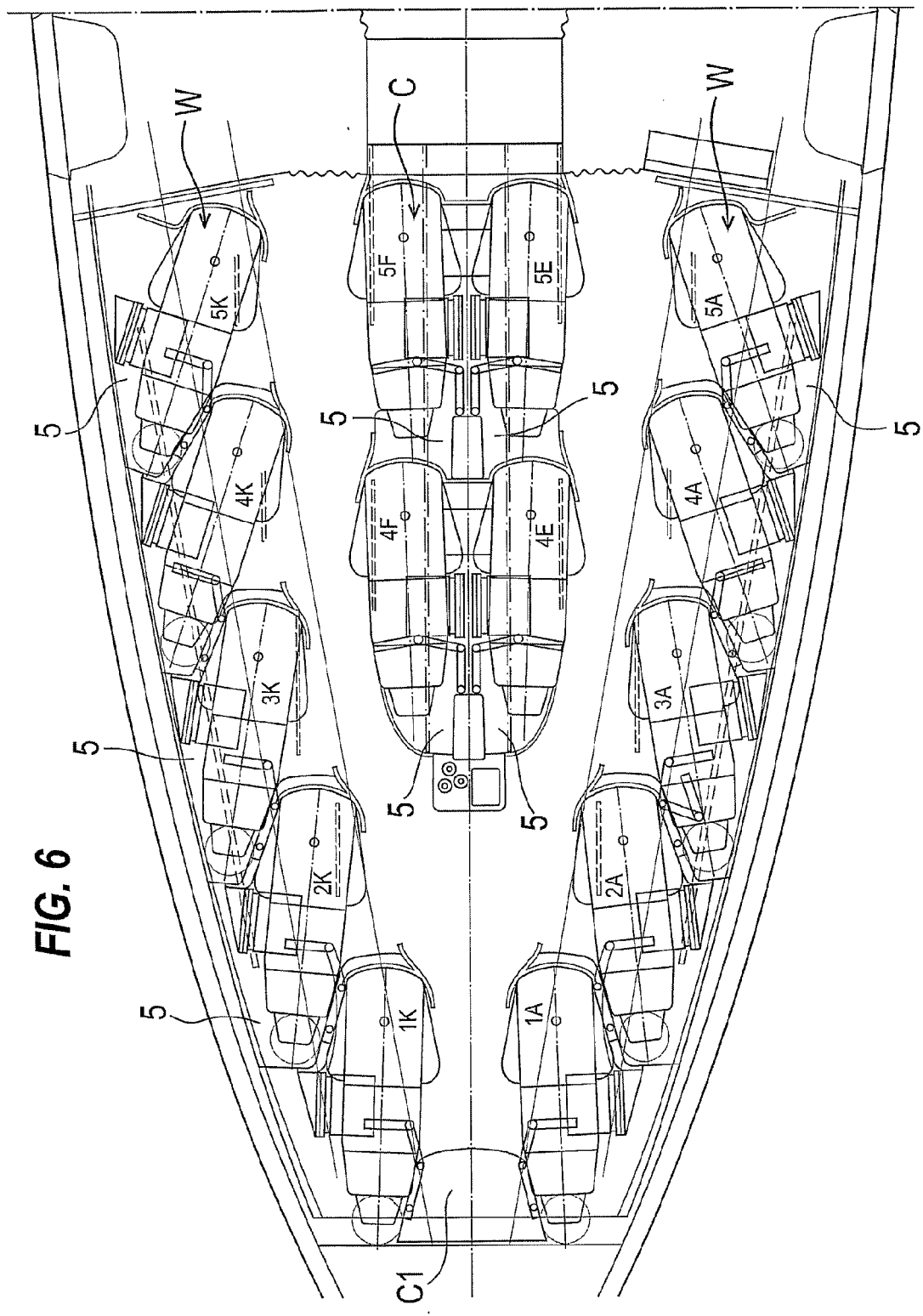
FIG. 6 shows a first possible cabin layout of a plurality of the seats.

FIG. 6 shows one possible cabin layout of seats according to an embodiment of the invention, suitable for a Boeing® 747-57 aircraft. Window seats W are arranged overlapping in the longitudinal direction, with the surrounds 5 at the side towards the window. Centre seats C are arranged in paired rows, with the surrounds at the inward side of each pair. Each of these arrangements uses the surround 5 to fill otherwise unusable space.

Figure 7:
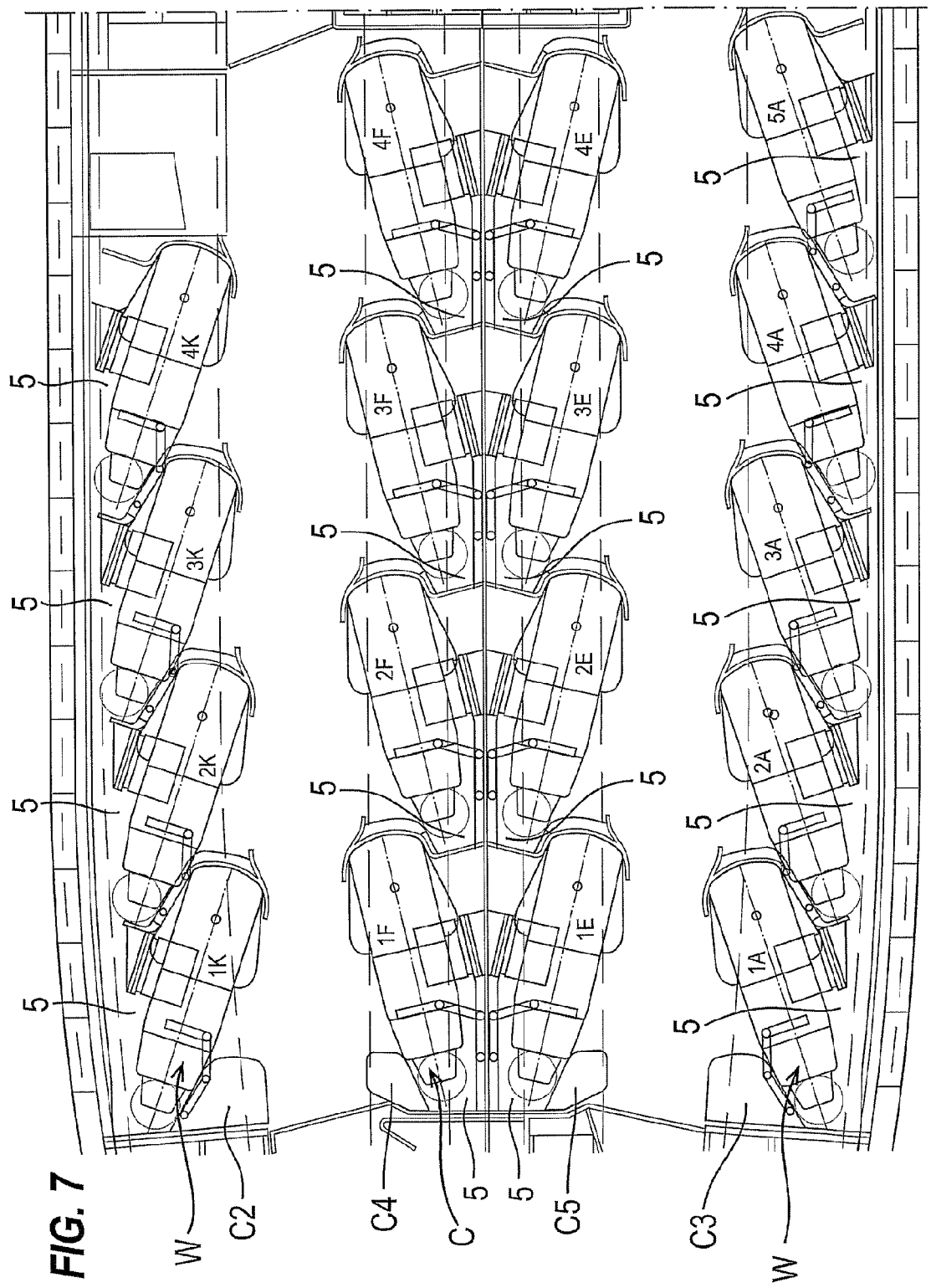
FIG. 7 shows a second possible cabin layout of a plurality of the seats.

FIG. 7 shows another possible layout, suitable for a Boeing® 777 17F-3 aircraft. This arrangement differs from that of FIG. 6 in that the centre seat pairs overlap longitudinally and the seats of each pair are angled mutually inwardly in the forward direction. This layout reduces the seat pitch of the centre seats C, at the expense of greater width for each pair.

Alternative Embodiments

Alternative embodiments of the invention may be apparent from reading the above description. Such alternative embodiments may nevertheless fall within the scope of the present invention.

The invention claimed is:

1. An aircraft passenger seating arrangement comprising a seat having a seat pan and a seat back, the seat being able to adopt a first, substantially upright sitting position and a second, sleeping position in which the seat back and seat pan are substantially horizontal so as to form respective parts of a substantially flat, horizontal sleeping surface, the arrangement further including a side surface arranged to form part of the substantially flat, horizontal sleeping surface substantially alongside the seat in the sleeping position, and an end surface arranged to form part of the substantially flat, horizontal sleeping surface forward of the seat, wherein the height of the side surface is fixed.

2. The arrangement of claim 1, wherein the end surface is substantially continuous with the side surface.

3. The arrangement of claim 1, wherein the end surface is integrated with the side surface to form a surround for the seat.

4. The arrangement of claim 1, wherein the seat includes an auxiliary surface that is positioned between the seat pan and the end surface in the sleeping position.

5. The arrangement of claim 4, wherein the auxiliary surface is connected to the seat pan.

6. The arrangement of claim 4, wherein the auxiliary surface is movable between a stowed configuration in the sitting position and a deployed configuration in the sleeping position.

7. The arrangement of claim 1, wherein the end surface comprises a secondary seat.

8. The arrangement of claim 1, wherein the end surface is movable between a configuration to form part of the substantially flat, horizontal sleeping surface, and a stowed position.

9. The arrangement of claim 1, including a footstool stowable under the end surface.

10. The arrangement of claim 1, wherein the seat includes at least one armrest to form part of the sleeping surface when the seat is in the sleeping position.

11. The arrangement of claim 10, wherein the armrest is movable between a raised position above the seat pan in the first position, and a lowered position so as to form part of the sleeping surface when the seat is in the sleeping position.

12. The arrangement of claim 1, wherein the side surface is positioned substantially alongside the seat pan in the sleeping position.

13. The arrangement of claim 1, wherein the side surface is elongate substantially in the longitudinal direction of the seat.

14. The arrangement of claim 1, wherein the seat is able to adopt a third, reclining position in which the seat back is reclined to a position intermediate that of the first and second positions, and the seat pan is more inclined than in the first position.

15. The arrangement of claim 1, wherein the underside of the side surface is provided with lighting means arranged to direct light substantially downwards.

16. An adjacent pair of seating arrangements according to claim 1, with the side surfaces of the pair arranged mutually inwardly.

17. An aircraft having a seating arrangement according to claim 1.

18. An aircraft cabin having a wall and a plurality of seating arrangements according to claim 1 arranged adjacent the wall, with the side surfaces of the seating arrangements provided at a side towards the wall.

19. An aircraft having a cabin according to claim 18.

20. The arrangement of claim 1, wherein the end surface is pivotally mounted.

21. An aircraft passenger seating arrangement comprising a seat having a seat pan and a seat back, the seat being able to adopt a first, substantially upright sitting position and a second, sleeping position in which the seat back and seat pan are substantially horizontal so as to form respective parts of a substantially flat, horizontal sleeping surface, the arrangement further including a side surface arranged to form part of the substantially flat, horizontal sleeping surface substantially alongside the seat in the sleeping position, and an end surface arranged to form part of the substantially flat, horizontal sleeping surface forward of the seat, wherein the end surface is substantially continuous with the side surface.

22. An aircraft passenger seating arrangement comprising a seat having a seat pan and a seat back, the seat being able to adopt a first, substantially upright sitting position and a second, sleeping position in which the seat back and seat pan are substantially horizontal so as to form respective parts of a substantially flat, horizontal sleeping surface, the arrangement further including a side surface arranged to form part of the substantially flat, horizontal sleeping surface substantially alongside the seat in the sleeping position, and an end surface arranged to form part of the substantially flat, horizontal sleeping surface forward of the seat, wherein the end surface and the side surface form a surround for the seat.

* * * * *